No. 756,472. PATENTED APR. 5, 1904.
J. CARPENTER.
WHEEL.
APPLICATION FILED SEPT. 19, 1903.
NO MODEL.
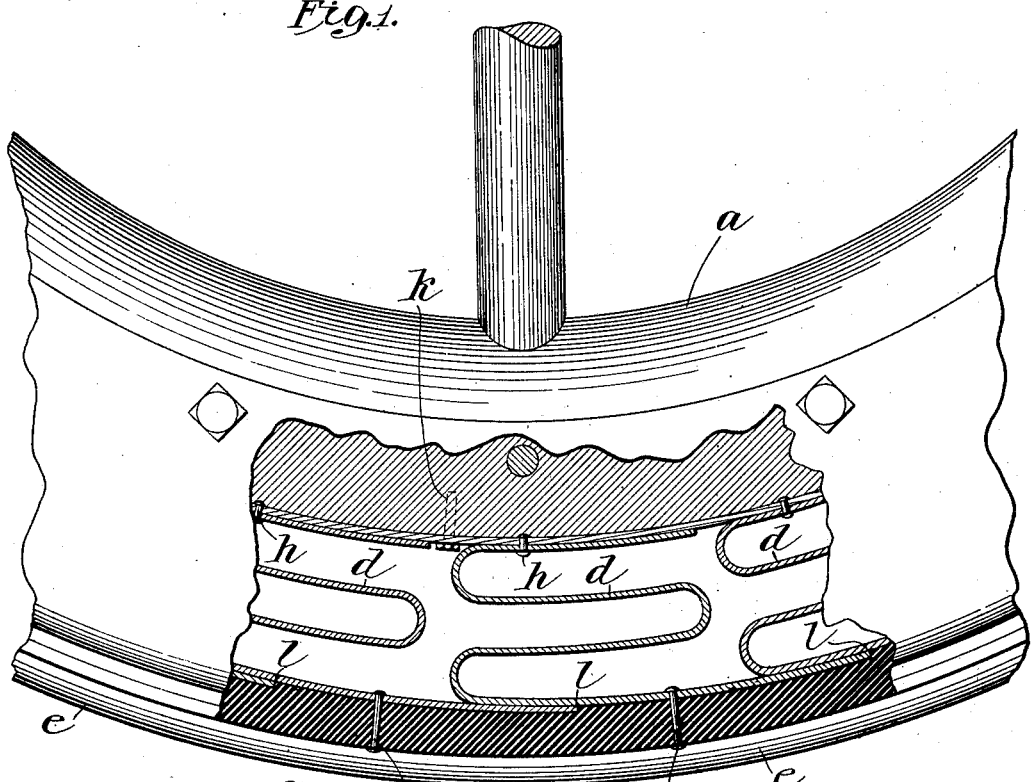
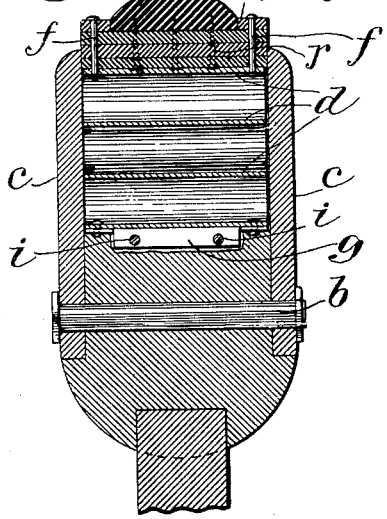
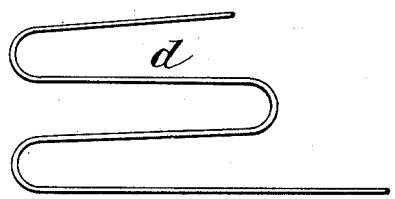
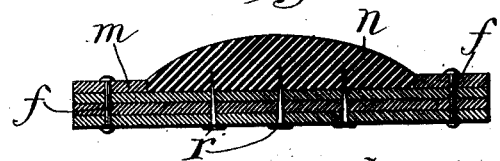
Witnesses
Inventor
James Carpenter
By his Attorneys No. 756,472. Patented April 5, 1904.

UNITED STATES PATENT OFFICE.

JAMES CARPENTER, OF BROOKLYN, NEW YORK.

WHEEL.

SPECIFICATION forming part of Letters Patent No. 756,472, dated April 5, 1904.

Application filed September 19, 1903. Serial No. 173,774. (No model.)

*To all whom it may concern:*

Be it known that I, JAMES CARPENTER, a citizen of the United States, residing at No. 126 Hendrix avenue, borough of Brooklyn, city of New York, in the State of New York, have invented certain new and useful Improvements in Wheels, of which the following is a specification, reference being had to the accompanying drawings, forming a part hereof.

This invention relates to vehicle-wheels; and its object is to provide vehicle-wheels which shall be capable of supporting a vehicle resiliently, even though no "body-springs" be provided, and which, furthermore, shall increase the comfortableness of vehicles which are provided with body-springs.

In many vehicles to which this invention may be applied there are no body-springs—such as, for instance, the class of vehicles comprised under the general head of "velocipedes." In such vehicles the invention will serve to reduce and in many cases eliminate the shocks which the rider or occupants receive much more satisfactorily than the common rubber tire. In other vehicles the improved wheels will serve to assist the body-springs in their function of taking up the jolts and jars to which vehicles in use are subjected.

According to the present improvements resilient members or springs are provided between the wheel rim and tire, and the present invention has to do more particularly with the construction of such resilient members or springs and with the tires and rims of the wheels upon which they are provided, all of which will be more particularly described hereinafter with reference to the accompanying drawings, in which—

Figure 1 is a view in elevation of a portion of a wheel containing the improvements, a portion of the same being broken away to show the resilient members or springs in position. Fig. 2 is a view in section of the wheel rim and tire between which the resilient members or springs are placed, the section being taken radially at the point where the two ends of a band to which the springs are secured are fastened together. Fig. 3 is a side elevation of one of the resilient members or springs, and Fig. 4 is a sectional view of a tire which it is preferable to use in connection with the resilient members or springs.

The present improvements concern more particularly wheel-rims, and the rest of the wheel may obviously be constructed in any suitable manner, being shown conventionally in the drawings.

Referring to the present improvements, the felly $a$, in which the spokes are fastened in any convenient way, has secured thereto by bolts $b$ two ring plates $c$, which form the sides of the rim. Between these ring plates is a hollow space in which peculiarly-constructed springs $d$ are located, and resting partly within the hollow space is the tire $e$, which is secured to the outer ends of the springs by bolts $f$. The other ends of the springs rest against the felly $a$ of the wheel, a band $g$ being provided around the felly, to which the springs are secured by means of rivets $h$. The ends of this band are preferably bent over and are secured together by suitable fastenings $i$, which are preferably bolts, with right and left handed screws thereon for convenience in manipulation, and the band is secured to the felly by bolts $k$, Fig. 1. Each spring is constructed of a flat piece of resilient material, such as sheet-steel, the dimensions and character of the material from which the springs are constructed depending, preferably, upon the particular use for which the wheel is intended. To form the spring, each strip is bent three times, as shown particularly in Fig. 3, thus forming a zigzag-shaped piece having three loops and one end of the spring projecting or being extended somewhat in advance of the rest of the spring. The springs are all secured to the band $g$ by fastening their short ends thereto by any suitable means, being suitably distanced or separated from each other, so that the loops or bended portions will not interfere or touch each other, but with their extended ends overlapping. In this way the extended end of one spring rests upon the outer portion of one of the adjacent springs and forms an even surface for the tire to rest upon, the extended end of each spring resting between the outer end of an adjacent spring and the tire.

So far as the springs are concerned the tire may be constructed from any suitable material. It is preferable, however, that the portion of the tire adjacent to the springs be of an unyielding or non-extensible material, so that it will not stretch and become extended and thereby work loose around the springs. In accordance with the invention, therefore, that portion of the tire which surrounds and binds the springs is constructed of a soft but non-extensible material, such as duck or duck combined with rubber strands, as is commonly used in the manufacture of belting, whereby the tire will retain its initial shape and length and will at all times bind the springs tightly against the felly.

The bearing or outer surface of the tire may be of rubber or any other suitable resilient material. In Fig. 4, in which such a tire is illustrated in section, the reference-letter $m$ indicates the duck or inextensible portion thereof and the reference-letter $n$ the rubber or bearing portion. This bearing or rubber portion fits within a groove or channel in the portion $m$, being made smaller in circumference than the groove and stretched into place therein, and may be easily removed and replaced from time to time as it becomes worn or otherwise destroyed. Small spikes $r$ are preferably inserted from the portion $m$ into the portion $n$ to hold the two portions from relative movement.

To secure the tire to the wheel, rivets are inserted through the springs and the tire. Furthermore, the tire is preferably provided with projections or notches $l$ upon its inner side, Fig. 1, and against these projections the respective extensions of the springs rest. In this way if the wheel is mounted to turn in the direction of the arrow in Fig. 1 there can be no slipping or sliding backward of the tire upon the springs.

In assembling the several parts which make up the rim of the wheel according to this invention the springs are first secured around the band $g$, which is then adjusted upon and secured around the felly of the wheel by tightening up on the right and left handed screws on the bolts. The springs are then compressed in any suitable manner, and the tire is slipped over the springs while still compressed. The springs afterward being freed exert a radial thrust outwardly upon the tire, giving great resiliency thereto. As soon as the tire has been thus placed upon the springs and the springs freed the ring plates $c$ are adjusted and secured upon each side of the wheel-rim, as before described.

The action of the tire and springs when the wheel is in use will be obvious. The tire, which projects beyond the ring plates, will be yieldingly supported upon the springs, and that portion of the tire upon which the wheel rests will move in and out between the ring plates upon the alternate yielding and extending of the springs as the wheel is rotated. The construction of the springs is such that they will work evenly—that is, in a radial direction only—and thus they do not bind upon or interfere with each other. Furthermore, each spring having at least three loops therein, the extended portion of the springs, which overlap each other, will not move or scrape upon each other to any substantial extent, and thus their action is noiseless. The springs are constructed and assembled so that they coöperate to furnish an even and continuous surface for the tire, which surface also yields easily and does not offer more resistance to compression at certain points (points where the springs come) than at other points.

I claim as my invention—

1. In a wheel-rim, the combination of springs interposed between the felly and the tire, each spring comprising a strip of resilient material bent into a zigzag form and having three loops, one end of which is against the felly and the other end extended so as to rest freely between the outer end of the next spring and the tire.

2. In a wheel-rim, the combination of a band secured around the felly, a plurality of springs secured to the band, each spring comprising a zigzag-shaped strip of resilient material with its outer end extended and resting freely between the outer end of the next spring and the tire.

3. In a wheel-rim, the combination of a band secured around the felly, a plurality of springs secured to the band, each spring comprising a zigzag-shaped strip of resilient material having three loops and with its outer end extended so as to rest freely between the outer end of the adjacent spring and the tire.

4. In a wheel-rim, the combination of a tire with projections or notches therein, a plurality of springs between said tire and the felly, each spring comprising a zigzag-shaped strip of resilient material having its outer end extended and engaging one of the notches or projections and resting upon the outer end of an adjacent spring.

This specification signed and witnessed this 17th day of September, A. D. 1903.

JAMES CARPENTER.

In presence of—
JOHN M. SCOBLE,
M. TAYDON.